US008887235B2

(12) United States Patent
Patel et al.

(10) Patent No.: US 8,887,235 B2
(45) Date of Patent: Nov. 11, 2014

(54) AUTHENTICATION INTERWORKING

(75) Inventors: Pulin R. Patel, McKinney, TX (US);
Rashad Mohammad Ali, Plano, TX (US); Zeev V. Lubenski, Richardson, TX (US)

(73) Assignee: Mavenir Systems, Inc., Richardson, TX (US)

( * ) Notice: Subject to any disclaimer, the term of this patent is extended or adjusted under 35 U.S.C. 154(b) by 2224 days.

(21) Appl. No.: 11/550,343

(22) Filed: Oct. 17, 2006

(65) Prior Publication Data
US 2008/0092212 A1    Apr. 17, 2008

(51) Int. Cl.
*G06F 7/04* (2006.01)
*G06F 15/173* (2006.01)
*H04L 12/66* (2006.01)
*H04L 29/06* (2006.01)
*H04W 12/06* (2009.01)
*H04L 29/08* (2006.01)

(52) U.S. Cl.
CPC .............. H04L 63/08 (2013.01); H04L 12/66 (2013.01); H04L 63/18 (2013.01); H04L 63/0853 (2013.01); H04W 12/06 (2013.01); H04L 67/306 (2013.01)
USPC .............................................. 726/3; 709/224

(58) Field of Classification Search
CPC ......... H04L 63/08; H04L 63/10; H04L 63/20; H04L 29/06; H04L 63/0428; H04L 63/102; H04L 29/06027; H04L 29/06326; H04L 12/66; G06F 21/6218; H04W 12/06; H04M 7/006
USPC ......... 713/168; 380/270; 707/10; 726/2–3, 1, 726/4; 709/225, 224; 455/433, 435.1; 370/328, 338, 352, 400
See application file for complete search history.

(56) References Cited

U.S. PATENT DOCUMENTS

| | | | | |
|---|---|---|---|---|
| 6,104,928 | A | * | 8/2000 | Waugh ........................ 455/445 |
| 6,374,110 | B1 | * | 4/2002 | Parker et al. ................. 455/445 |
| 6,904,035 | B2 | | 6/2005 | Requena |
| 7,096,014 | B2 | * | 8/2006 | Haverinen et al. ......... 455/432.1 |
| 7,126,942 | B2 | * | 10/2006 | Strathmeyer et al. ......... 370/352 |
| 7,155,526 | B2 | * | 12/2006 | Chaudhary et al. ........... 709/229 |
| 7,231,203 | B2 | * | 6/2007 | Marcelli ....................... 455/411 |
| 7,542,468 | B1 | * | 6/2009 | Begley et al. ................. 370/389 |

(Continued)

FOREIGN PATENT DOCUMENTS

| | | |
|---|---|---|
| EP | 1788764 | 5/2007 |
| GB | 2365699 | * 2/2002 |

(Continued)

OTHER PUBLICATIONS

Notification of Transmittal of the International Preliminary Report on Patentability of Application No. PCT/US2007/081669 filed Oct. 17, 2007 and mailed Feb. 6, 20098 (12 pages).

(Continued)

*Primary Examiner* — Abu Sholeman
(74) *Attorney, Agent, or Firm* — Andrews Kurth LLP

(57) ABSTRACT

The present disclosure includes a method and system for authentication interworking. In some embodiments, a method includes receiving, from a communication device, a request for services from a core network. The communication device is foreign to the core network. Authentication internetworking is provided to the foreign device to enable access to services provided by the core network.

10 Claims, 10 Drawing Sheets

(56) References Cited

U.S. PATENT DOCUMENTS

| | | | |
|---|---|---|---|
| 7,706,356 B1* | 4/2010 | Olshansky et al. | 370/352 |
| 7,778,193 B2* | 8/2010 | Mizuno et al. | 370/252 |
| 7,813,730 B2* | 10/2010 | Patel et al. | 455/433 |
| 7,913,096 B2* | 3/2011 | Leone et al. | 713/193 |
| 8,037,514 B2* | 10/2011 | Kuffel et al. | 726/5 |
| 8,111,620 B1* | 2/2012 | Swan et al. | 370/230 |
| 8,184,530 B1* | 5/2012 | Swan et al. | 370/230 |
| 8,504,081 B2* | 8/2013 | Waytena et al. | 455/466 |
| 8,612,582 B2* | 12/2013 | Dare et al. | 709/224 |
| 8,650,290 B2* | 2/2014 | Dare et al. | 709/224 |
| 8,745,213 B2* | 6/2014 | Dare et al. | 709/224 |
| 2002/0024943 A1* | 2/2002 | Karaul et al. | 370/338 |
| 2002/0065785 A1* | 5/2002 | Tsuda | 705/67 |
| 2003/0081565 A1 | 5/2003 | McIntosh | |
| 2003/0119481 A1* | 6/2003 | Haverinen et al. | 455/411 |
| 2003/0133421 A1* | 7/2003 | Sundar et al. | 370/328 |
| 2004/0139201 A1* | 7/2004 | Chaudhary et al. | 709/229 |
| 2004/0184420 A1* | 9/2004 | Xu et al. | 370/328 |
| 2005/0221813 A1* | 10/2005 | Rajahalme et al. | 455/422.1 |
| 2006/0105810 A1 | 5/2006 | Gnuschkle | |
| 2006/0107037 A1* | 5/2006 | Lincoln et al. | 713/155 |
| 2006/0189298 A1* | 8/2006 | Marcelli | 455/411 |
| 2006/0200670 A1* | 9/2006 | Kuffel et al. | 713/170 |
| 2006/0229129 A1 | 10/2006 | Jalava et al. | |
| 2006/0245403 A1* | 11/2006 | Kumar | 370/338 |
| 2006/0265504 A1* | 11/2006 | Taaghol et al. | 709/227 |
| 2006/0276193 A1* | 12/2006 | Itzkovitz et al. | 455/445 |
| 2006/0280127 A1* | 12/2006 | Mizuno et al. | 370/254 |
| 2006/0291454 A1* | 12/2006 | Ali | 370/352 |
| 2007/0002832 A1* | 1/2007 | Sylvain | 370/352 |
| 2007/0022289 A1* | 1/2007 | Alt et al. | 713/168 |
| 2007/0094691 A1* | 4/2007 | Gazdzinski | 725/62 |
| 2007/0191014 A1 | 8/2007 | Zheng et al. | |
| 2007/0197221 A1* | 8/2007 | Ryu et al. | 455/435.2 |
| 2007/0197293 A1 | 8/2007 | Jalava et al. | |
| 2008/0046978 A1* | 2/2008 | Rieger | 726/4 |
| 2008/0062985 A1* | 3/2008 | Agarwal et al. | 370/392 |
| 2008/0076386 A1* | 3/2008 | Khetawat et al. | 455/410 |
| 2008/0076420 A1* | 3/2008 | Khetawat et al. | 455/435.1 |
| 2008/0090555 A1* | 4/2008 | Patel et al. | 455/414.1 |
| 2008/0091824 A1* | 4/2008 | Patel et al. | 709/225 |
| 2008/0096591 A1* | 4/2008 | Waytena et al. | 455/466 |
| 2008/0096592 A1* | 4/2008 | Waytena et al. | 455/466 |
| 2008/0115172 A1* | 5/2008 | Denny et al. | 725/58 |
| 2008/0148358 A1* | 6/2008 | Denny et al. | 726/4 |
| 2008/0244262 A1* | 10/2008 | Du et al. | 713/155 |
| 2008/0267170 A1* | 10/2008 | Allen et al. | 370/352 |
| 2008/0268824 A1* | 10/2008 | Allen et al. | 455/415 |
| 2008/0268825 A1* | 10/2008 | Allen et al. | 455/415 |
| 2008/0287134 A1* | 11/2008 | Catovic et al. | 455/445 |
| 2008/0311884 A1* | 12/2008 | Ala-Laurila et al. | 455/406 |
| 2009/0023458 A1 | 1/2009 | Mountney | |
| 2009/0190550 A1 | 7/2009 | Giustina et al. | |
| 2009/0247120 A1* | 10/2009 | Heutschi et al. | 455/406 |
| 2009/0320077 A1* | 12/2009 | Gazdzinski | 725/62 |
| 2009/0323636 A1* | 12/2009 | Dillon et al. | 370/331 |
| 2010/0011099 A1* | 1/2010 | Chintada et al. | 709/224 |
| 2010/0138900 A1* | 6/2010 | Peterka et al. | 726/4 |
| 2010/0217837 A1* | 8/2010 | Ansari et al. | 709/218 |
| 2012/0144463 A1* | 6/2012 | Satarasinghe et al. | 726/6 |

FOREIGN PATENT DOCUMENTS

| | | |
|---|---|---|
| GB | 2365699 A1 | 2/2002 |
| WO | WO 02/093811 A2 | 11/2002 |
| WO | WO 2006/026901 A1 | 3/2006 |

OTHER PUBLICATIONS

Notification of Transmittal of the International Preliminary Report on Patentability of Application No. PCT/US2007/081642 filed Oct. 17, 2007 and mailed Feb. 6, 2009 (14 pages).

Notification of Transmittal of The International Search Report and The Written Opinion of the International Searching Authority of Application No. PCT/US2007/081669, filed Oct. 17, 2007, (13 pages) mailed Jul. 4, 2008.

Notification of Transmittal of The International Search Report and The Written Opinion of the International Searching Authority of Application No. PCT/US2007/081642 Filed Oct. 17, 2007 (13 pages) mailed Jul. 3, 2008.

Office Action issued in U.S. Appl. No. 11/550,334 on Jan. 6, 2010; 21 pages.

Office Action issued in U.S. Appl. No. 11/550,334 on Jul. 15, 2009; 18 pages.

Advisory Action issued in U.S. Appl. No. 11/550,334 on Feb. 27, 2009; 3 pages.

Office Action issued in U.S. Appl. No. 11/550,334 on Jan. 26, 2009; 18 pages.

Office Action issued in U.S. Appl. No. 11/550,334 on Sep. 3, 2008; 18 pages.

* cited by examiner

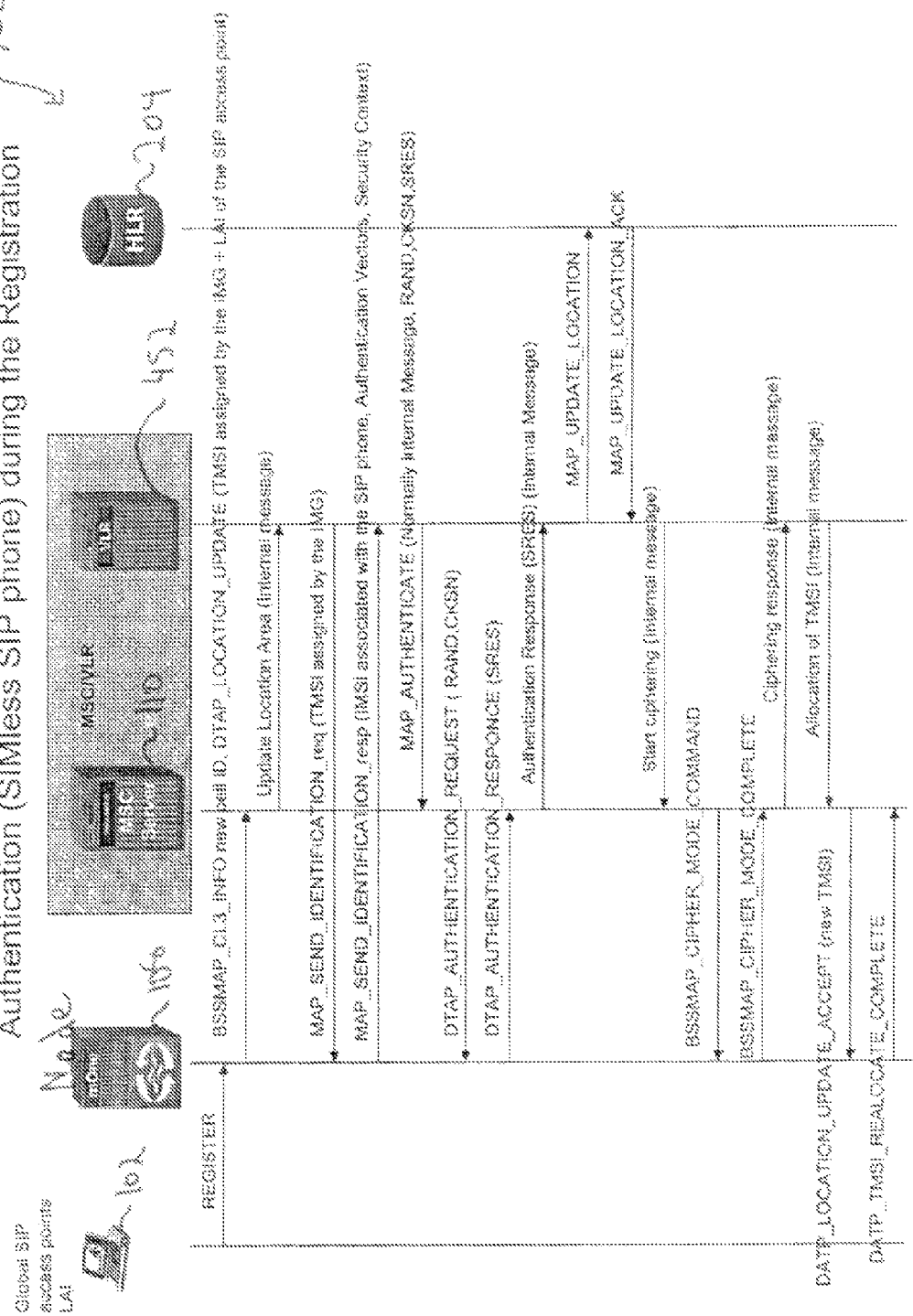

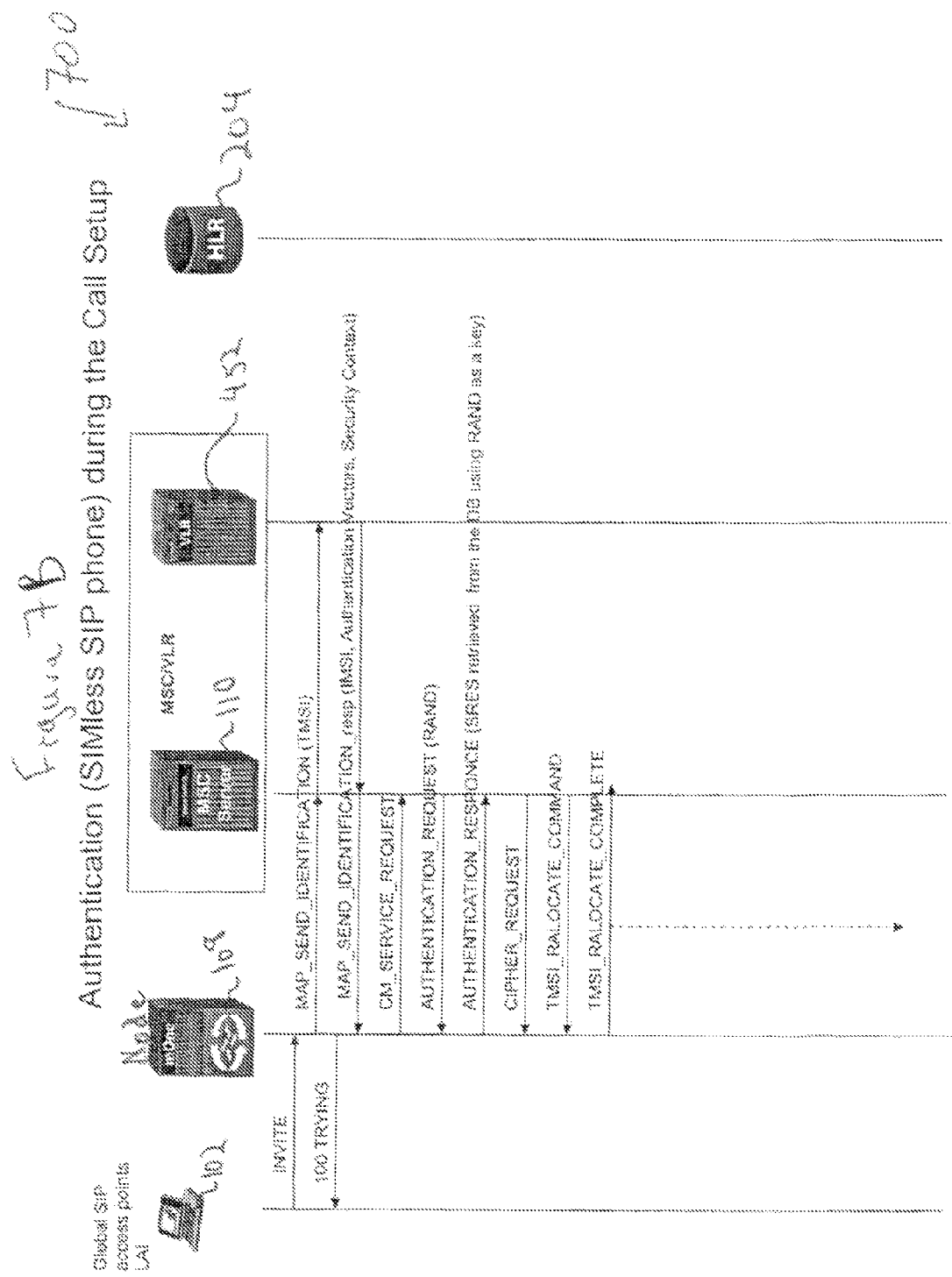

AUTHENTICATION INTERWORKING

TECHNICAL FIELD

This invention relates to communication networks, and more particularly to authentication interworking.

BACKGROUND

Communication networks include wired and wireless networks. Example wired networks include the Public Switched Telephone Network (PSTN) and the Internet. Example wireless networks include cellular networks as well as unlicensed wireless networks that connect to wire networks. Calls and other communications may be connected across wired and wireless networks.

Cellular networks are radio networks made up of a number of radio cells, or cells, that are each served by a base station or other fixed transceiver. The cells are used to cover different areas in order to provide radio coverage over a wide area. When a cell phone moves from place to place, it is handed off from cell to cell to maintain a connection. The handoff mechanism differs depending on the type of cellular network. Example cellular networks include Universal Mobile Telecommunications System (UMTS), Wide-band Code Division Multiple Access (WCDMA), and CDMA2000. Cellular networks communicate in a radio frequency band licensed and controlled by the government.

SUMMARY

The present disclosure includes a method and system for authentication interworking. In some embodiments, a method includes receiving, from a communication device, a request for services from a core network. The communication device is foreign to the core network. Authentication internetworking is provided to the foreign device to enable access to services provided by the core network.

The details of one or more embodiments of the invention are set forth in the accompanying drawings and the description below. Other features, objects, and advantages of the invention will be apparent from the description and drawings, and from the claims.

DESCRIPTION OF DRAWINGS

FIGS. 7A and 7B illustrate a call flow for authenticating devices for receiving foreign services in the communication system of FIG. 4.

DETAILED DESCRIPTION

Figure 1:
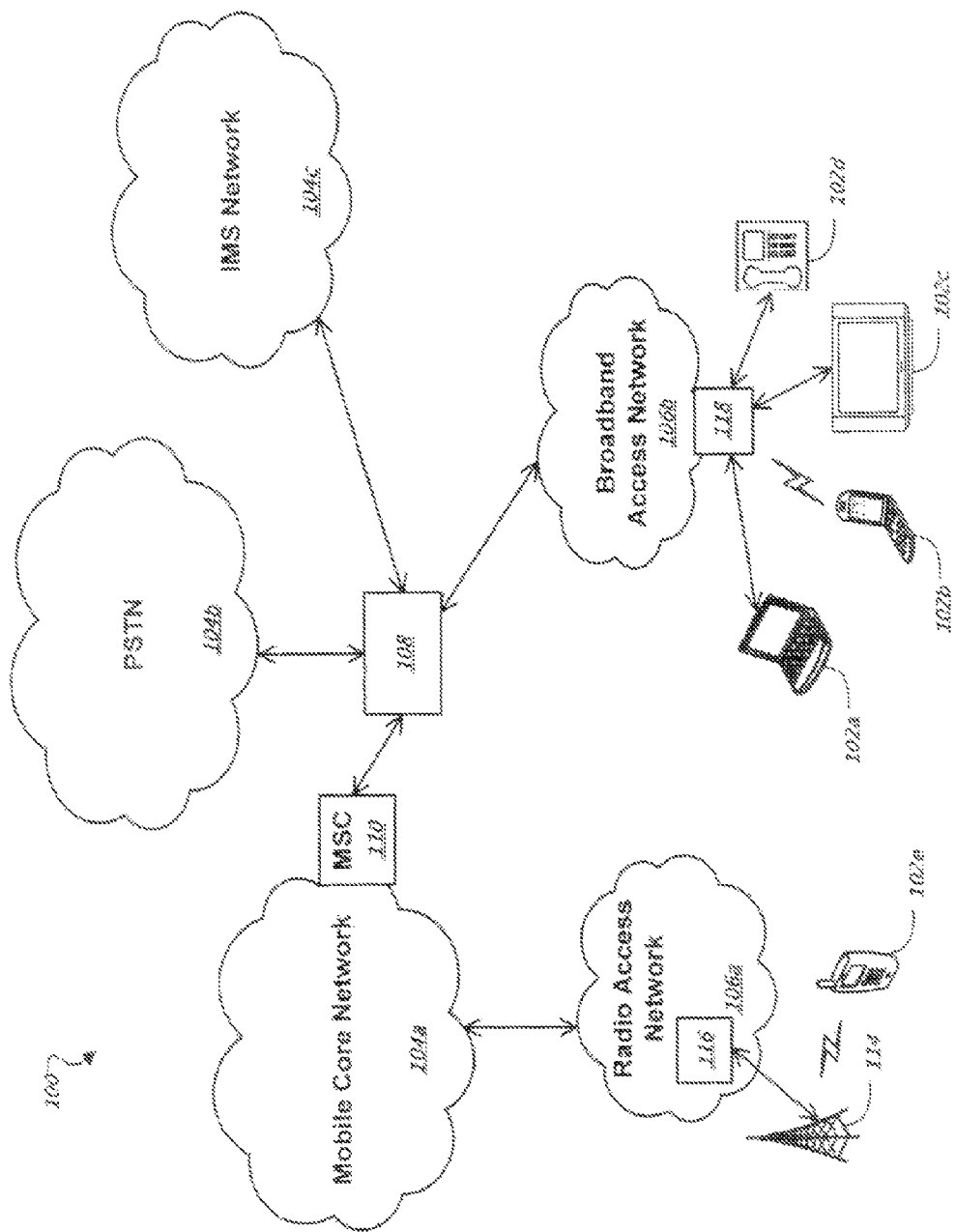
FIG. 1 is a block diagram illustration a communication system in accordance with some embodiments of the present disclosure.

FIG. 1 illustrates a communication system 100 for providing authentication internetworking to foreign devices in accordance with some embodiments of the present disclosure. In general, a foreign device 102, as used herein, means any communication device 102 that can not directly access or otherwise communicate with one or more core networks 104. Indeed, this foreign device 102 is merely in terms of particular core networks 104—in other words, the foreign device 102 may communicate with and receive services from other core networks 104. In other words, a communication device 102 may be foreign to a core network 104 and, thus, unable to communicate directly with or receive services from that core network 104. To overcome this obstacle, system 100 may use authentication information of another device 102, i.e., a master device 102, to authenticate the foreign device 102 with that core network 102. For example, the foreign communication device 102 may communicate via Session Initiation Protocol (SIP) technology and, thus, be unable to directly access services from a Global System for Mobile Communication (GSM) core network 104. By receiving, storing, or otherwise identifying authentication information associated with a GSM device 102, system 100 may use the GSM authentication information to authenticate the SIP device 102 with GSM core network 104. In doing so, the SIP device 102 may be able to access services provided by the GSM core network 104 such as call waiting, caller identification, mobility management, and/or other GSM services.

At a high level, system 100 includes communication devices 102, core networks 104, access networks 106, and communication node 108. Each communication device 102 comprises an electronic device operable to receive and transmit network communication with system 100. As used in this disclosure, communication devices 102 are intended to encompass cellular phones, data phones, pagers, portable and stationary computers, smart phones, personal data assistants (PDAs), televisions, electronic gaming devices, one or more processors within these or other devices, or any other suitable processing devices capable of communicating information over a wireless or wired link to access networks 106. Generally, the communication devices 102 may transmit voice, video, multimedia, text, web content or any other user/client-specific content. In short, device 102 generates requests, responses or otherwise communicates with core networks 104 via access networks 106. For purposes of example, a computer device 102a, SIP telephone device 102b, television device 102c, and telephone device 102d are shown communicating with broadband access network 106b. A cellular device 102e communicates with radio access network 106a.

In the illustrated embodiment, core networks 104 include mobile core network 104a, Public Switched Telephone Network (PSTN) 104b, and IP Multimedia Subsystem (IMS) network 104c. Mobile core network 104a typically includes various switching elements and gateways for providing cellular services. Mobile core network 104a often provides these services via a number of Radio Access Networks (RANs), such as RAN 106a, and also interfaces the cellular system with other communication systems such as PSTN 104b via mobile switching center (MSC) 110. In accordance with the Global System for Mobile Communications (GSM) standard, mobile core network 104a includes a circuit switched (or voice switching) portion for processing voice calls and a packet switched (or data switching) portion for supporting data transfers such as, for example, e-mail messages and web browsing. The circuit switched portion includes MSC 110 that switches or connects telephone calls between RAN 106a and PSTN 104b or another network. The packet-switched portion, also known as General Packet Radio Service (GPRS), includes a Serving GPRS Support Node (SGSN) (not illustrated), similar to MSC 110, for serving and tracking communication devices 102, and a Gateway GPRS Support Node (GGSN) (not illustrated) for establishing connections between packet-switched networks and communication devices 102. The SGSN may also contain subscriber data useful for establishing and handing over call connections. Mobile core network 104a may also include a home location register (HLR) for maintaining "permanent" subscriber data and a visitor location register (VLR) (and/or an SGSN) for "temporarily" maintaining subscriber data retrieved from the HLR and up-to-date information on the location of those communication devices 102 using a wireless communications method. In addition, mobile core network 104a may include Authentication, Authorization, and Accounting (AAA) that performs the role of authenticating, authorizing, and accounting for devices 102 operable to access mobile core network 104a.

PSTN 104b comprises a circuit-switched network that provides fixed telephone services. A circuit-switched network provides a dedicated, fixed amount of capacity (a "circuit") between the two devices for the duration of a transmission session. In general, PSTN 104b may transmit voice, other audio, video, and data signals. In transmitting signals, PSTN 104b may use one or more of the following: telephones, key telephone systems, private branch exchange trunks, and certain data arrangements. Since PSTN 104b may be a collection of different telephone networks, portions of PSTN 104b may use different transmission media and/or compression techniques. Completion of a circuit in PSTN 104b between a call originator and a call receiver may require network signaling in the form of either dial pulses or multi-frequency tones.

IMS network 104c is a network that enables mobile communication technology to access IP based services. The IMS standard was introduced by the 3rd generation partnership project (3GPP) which is the European 3rd generation mobile communication standard. In general, the IMS standard discloses a method of receiving an IP based service through a wireless communication terminal such as those communication devices 102 which are capable of wireless communications, for example wireless telephone 102b. To achieve these goals, IMS network 104c uses Session Initiation Protocol (SIP) and, in some embodiments, wireless telephone 102b is operable to use the same protocol when accessing services through broadband access network 106b. Although not illustrated, IMS network 104c may include call session control function (CSCF), home subscriber server (HSS), application server (AS), and other elements. CSCF acts as a proxy and routes SIP messages to IMS network components such as AS. HSS typically functions as a data repository for subscriber profile information, such as a listing of the type of services allowed for a subscriber. AS provides various services for users of IMS network 104c, such as, for example, video conferencing, in which case AS handles the audio and video synchronization and distribution to communication devices 102.

Turning to access networks 106, access networks 106 include RAN 106a and broadband network 106b. RAN 106a provides a radio interface between mobile device 102e and mobile core network 104a which may provide real-time voice, data, and multimedia services (e.g., a call) to mobile device 102e. In general, RAN 106a communicates air frames via radio frequency (RF) links. In particular, RAN 106a converts between air frames to physical link based messages for transmission through mobile core network 104a. RAN 106a may implement, for example, one of the following wireless interface standards during transmission: Advanced Mobile Phone Service (AMPS), GSM standards, Code Division Multiple Access (CDMA), Time Division Multiple Access (TDMA), IS-54 (TDMA), General Packet Radio Service (GPRS), Enhanced Data Rates for Global Evolution (EDGE), or proprietary radio interfaces. Users may subscribe to RAN 106a, for example, to receive cellular telephone service, Global Positioning System (GPS) service, XM radio service, etc.

RAN 106a may include Base Stations (BS) 114 connected to Base Station Controllers (BSC) 116. BS 114 receives and transmits air frames within a geographic region of RAN 106a (i.e. transmitted by a cellular device 102e) and communicates with other mobile devices 102 connected to the mobile core network 104a. Each BSC 116 is associated with one or more BS 114 and controls the associated BS 114. For example, BSC 116 may provide functions such as handover, cell configuration data, control of RF power levels or any other suitable functions for managing radio resource and routing signals to and from BS 114. MSC 110 handles access to BSC 116 and communication node 108, which may appear as a BSC 116 to MSC 110. MSC 110 may be connected to BSC 116 through a standard interface such as the A-interface.

Broadband access network 106b facilitates communication between communication devices 102 and communication node 108. In general, broadband access network 106b communicates IP packets to transfer voice, video, data, and other suitable information between network addresses. In the case of multimedia sessions, broadband access network 106b uses Voice over IP (VoIP) protocols to set up, route, and tear down calls. Communication devices 102 connect to broadband access network 106b through an access point 118. Access point 118 may include one or more local area networks (LANs), metropolitan area networks (MANs), wide area networks (WANs), all or a portion of the global computer network known as the Internet, and/or any other communication system or systems at one or more locations. Users may subscribe to the broadband access network 106b, for example, to receive cable television services, DSL or modem internet access via the PSTN core network 104b, wireless microwave broadband internet access (WiMAX), fiber optic cable internet access (FTTC/H Ethernet), wireless personal access networking (WiFi/Bluetooth), digital mobile telephony access (GSM over IP, UMTS over IP), etc.

In general, communication node 108 can include any software, hardware, and/or firmware operable to provide user authentication internetworking. For example, communication node 108 may enable a device 102 to access foreign services provided by a core network 104. In this example, communication node 108 may use authentication information associated with a device 102 native to core network 104 in accessing the foreign services. The authentication information associated with the native device 102 may be locally stored, requested from the native device 102 in response to at least a request for foreign services, and/or provided to communication node 108 using any other suitable process. Alternatively or in addition, the authentication information may be associated with subscriber services. For example, the authentication information may be used to access some foreign services provided by core network 104 but not enable communication device 102 to access other foreign services from core network 104. In some instances, authentication information is provided to the subscriber as an access key for gaining admission to the services and/or technologies provided in a service subscription. The subscription services may be based on any appropriate parameter such as a specific device 102, specific user of a device 102, a device type, and/or any other suitable parameters that may distinguish different services.

In some cases, communication node 108 may use authentication information to provide foreign services where the information is owned by the requesting user but using a different device 102 to gain access to the subscription services. For example, a user subscribing to both a cellular service provided by mobile core network 104a and a DSL service provided by IMS network 104c may place a voice call through the laptop computer 102a, utilizing the cellular subscription commonly associated with mobile device 102e, by first requesting and authenticating subscriber access to the cellular service via communication node 108. In general, communication node 108 may be an integrated and/or stand alone unit and, in addition, may be part of a rack or system. In some embodiments, communication node 108 comprises a system. A system may be a single node, a plurality of nodes, or a portion of one or more nodes. A system may be distributed and may cross network boundaries.

In one aspect of operation, the subscriber may have previously registered the authentication information with the communication node 108, for example during subscription service sign-up. In another aspect of operation, the subscriber may only register contact information for the device 102 which contains the authentication information, for example an IP address, phone number, etc. The subscriber may receive a request from the communication node 108 through the locally subscribed device 102 whenever a foreign device 102 requests the authentication information to access subscription services within the foreign core network 104. Authentication information may alternatively be provided within a device separate from the communication devices 102, for example within a subscriber identity module (SIM), smart card, or any other secure electronic storage media in the possession of the subscriber.

The foreign device 102 may additionally require communications translation to communicate with the foreign core network 104. If the networking communications protocol(s) used by the foreign device 102 are incompatible with the networking communications protocol(s) understood by the foreign core network 104, communications node 108 may provide communication translation service for foreign device 102. For example, a user's laptop 102a may commonly communicate via the SIP standard for voice communications. To allow the laptop 102a to communicate via the user's cellular service subscription, the communications node 108 would translate the SIP messages to GSM before forwarding them to RAN 106a. Similarly, communications node 108 would intercept GSM responses from RAN 106a and translate them into SIP messages before forwarding them to laptop 102a. In this manner, the laptop 102a may communicate within the foreign network 104 using its native communication protocol.

The translation and authentication services offered by communications node 108 may be transparent to communication devices 102 and/or core networks 104. In the view of the surrounding core and access network equipment, communications node 108 may appear to be a standard networking router, switch, or other network edge communication device such as MSC 110. It may be capable of communicating in a wide variety of networking protocols, allowing many dissimilar networking components to view it as native equipment.

In one aspect of operation, communication node 108 receives a request for foreign services. For example, SIP device 102d may request call waiting services from GSM network 104a. In response to at least the request, communication node 108 identifies authorization information associated with a communication device 102 native to core network 104 that provides the foreign services. In some embodiments, the authorization information associated with the native device 102 may be locally stored at communication node 108. In some embodiments, communication node 102 may transmit a request to the native device 102 for the authorization information. Using the identified authorization information, communication node 108 authorizes the requesting device 102 to access foreign services as if the requesting device 102 is a native device 102. In some aspects of operation, a user may wish transfer a subscribe services to a different device 102 owned by the user. For example, the user may wish to watch the season premiere of a cable television series but the television 102c has ceased to function. In this example, the user may transmit a request to communication node 108 to transfer the digital cable subscription to the laptop 102a. Communications node 108 may retrieve the authentication information for the user's digital cable subscription and authorize access to digital cable with IMS network 104c. Once the user's service has been authenticated, communication node 108 may translate the digital cable television communication to a form compatible with the user's laptop 102a. In doing so, the user may now be able to watch the season premiere without the need for a functioning television.

Figure 2:
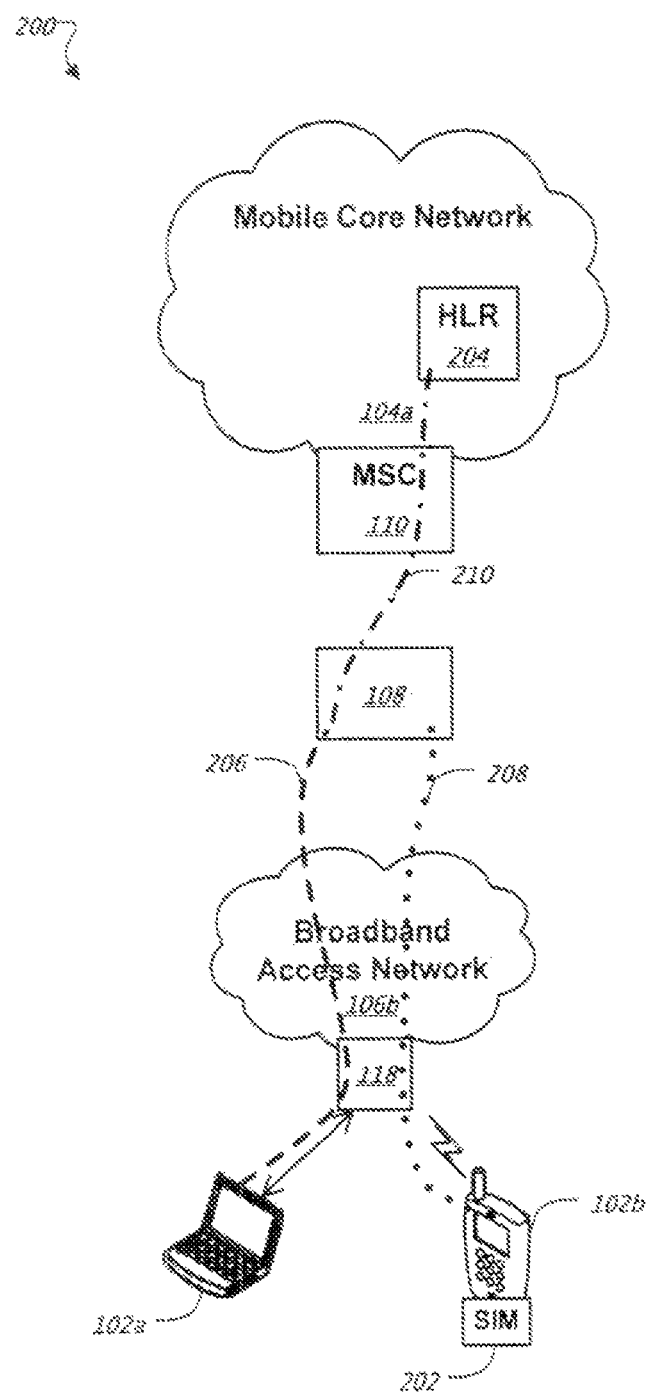
FIG. 2 is a session flow diagram illustrating authentication of foreign communication devices in communication system of FIG. 1.

FIG. 2 is a session flow diagram 200 illustrating an example signal path in authentication internetworking in accordance with some embodiments of the present disclosure. For ease of reference, only some of the elements of communication system 100 of FIG. 1 are shown. In the illustrated embodiment, communication node 108 authenticates laptop 102a with mobile core network 104a using a subscription held by cellular device 102b. In this example, communication node 108 may locally store authentication information, request the authentication information from cellular device 102b, request that cellular device 102b generate authentication information, or use any other suitable process for identifying authentication information associated with cellular device 102b.

The user, through the cellular device 102b, has subscriber access to one or more services provided by mobile core network 104a. In some embodiments, the subscriber has access to GSM services. To authenticate a cell device 102b with mobile core network 104a, cellular device 102b includes a Subscriber Identity Module (SIM) 202. For example, SIM card 202 may encrypt voice and data transmissions and store data about a specific user so that user can be identified and authenticated to mobile core network 104a. In some embodiments, SIM card 202 may comprise a Universal Subscriber Identity Module (USIM). In general, SIM card 202 is typically a smart card that securely stores the key identifying a mobile phone service subscriber, as well as subscription information, preferences, text messages and/or other information. In addition to storing authentication information, the SIM card 202 may store network state information such as the location area identity (LAI). In short, SIM 202 may contain the authentication key to access subscriber services in mobile core network 104a.

To allow laptop 102a intercommunication capability with mobile core network 104a, the laptop 102a first connects to the communication node 108 through the broadband access network 106b and requests services from mobile core network 104a. Laptop 102a accesses broadband subscription services through the access point 118, for example through a PSTN dial-up internet connection, DSL, cable modem, etc. Access point 118 in this circumstance may be a local internet service provider network. Laptop 102a sends data stream 206 through access point 118 to the broadband access network 106b and along to the communication node 108.

Communication node 108 intercepts the service request for access to the mobile core network 104a from laptop 102a. The request may be formatted, for example, in SIP protocol or in another protocol used for broadband devices to communicate data transmissions. In some embodiments, communications node 108 translates the request and discovers which core network 104 the laptop 102b is subscribed to (i.e., IMS network 104c). Communications node 108 may also determine which core network 104 the laptop 102a wants to access (i.e., mobile core network 104a).

The communication node 108 may initially determine whether laptop 102a has authorization to interface with mobile core network 104a. For example, communications node 108 determines whether laptop 102a has a subscription to the mobile core network 104a. In this case, laptop 104a may be a dual mode device that has a subscription to services provide by mobile core network 104a and IMS network 104c. Communication node 108 may locally store the subscription information for both core networks 104. In the event that laptop 102a is not natively compatible with mobile core network 104a, communications node 108 attempts to identify a device 102 which is compatible with the mobile core network 104a. For example, the user may own another device which subscribes to mobile core network 104a or the user may otherwise be associated with a mobile device 102.

In the case that communication node 108 does not locally store authentication information for mobile core network 104a, communications node 108 may identify a cellular device 102b as including authorization information for mobile core network 104a. Communications node 108 may transmit a request within data stream 208 to cellular device 102b to retrieve authorization information. In some embodiments, the authorization information is stored in the SIM 202. Rather than a SIM, authorization information may be stored in a UMTS Universal Subscriber Identity Module (USIM) for accessing the Radio Access Network 106a, a removable user-identity module (R-UIM) which is compatible with both GSM and CDMA (3G Cellular Network), or any other secure storage device capable of communicating subscriber information to mobile core network 104a.

Communications node 108 forwards the authentication information received from device 102b to MSC 110 on behalf of device 102a. A new data stream 210, containing information regarding data path 206 which is used to access laptop 102a plus authentication information received from cellular device 102b is created by data node 108. In one aspect of operation, communications node 108 represents the data stream 210 as a communication originating from cellular device 102b such that the foreign device, laptop 102a, is recognized as a service subscriber. The MSC 110 receives the authentication information and identify subscriber information. For example, MSC 110 may determine a subscription associated with the authorization information in the Home Location Register (HLR) 204. HLR 204 contains a database of subscribers.

The acceptance or denial of the authentication information is propagated back to laptop 102a via communications node 108. Communications node 108 may have to translate the response from a cellular communication technology (e.g., GSM) to a broadband communication technology (e.g., SIP). In one aspect of operation, in the event that authentication is accepted, communications node 108 may continue to translate data stream 206 into data stream 210 and back to allow laptop 102a to communicate with the mobile core network 104a via the cellular subscription service. In another aspect of operation, to be allowed access to a foreign core network 104, device 102 may require protocol communication capabilities to interface with the foreign core network technology. For example, laptop 102a may require the capability of communicating directly with GSM.

Figure 3:
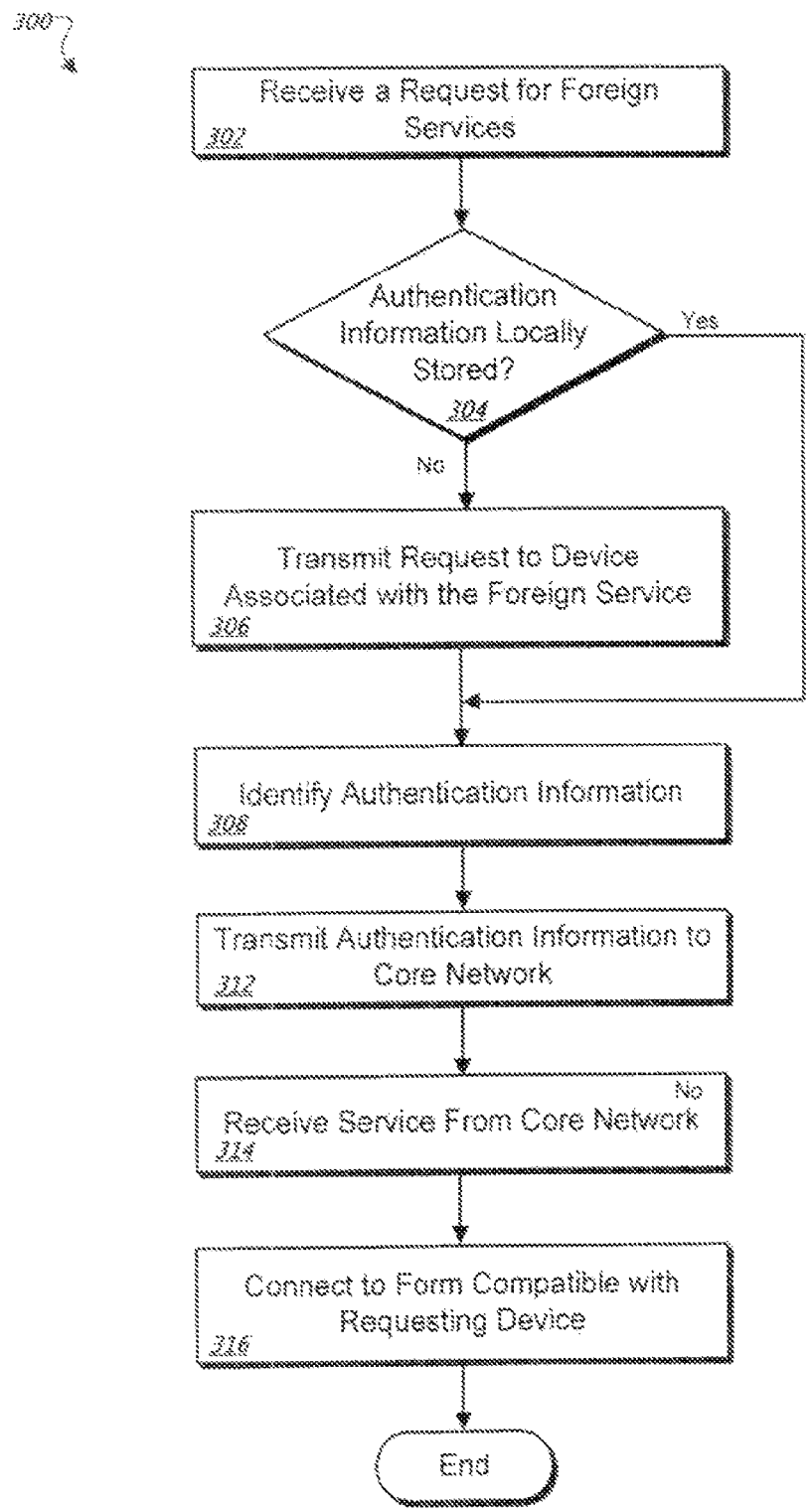
FIG. 3 is a flow chart illustrating an example method for authenticating a foreign device in communication system of FIG. 1.

FIG. 3 is a flow diagram illustrating an example method 300 for authenticating a device to provide foreign services. The illustrated method is described with respect to communication system 100 of FIG. 1, but these methods could be used by any other suitable system. Moreover, communication system 100 may use any other suitable techniques for performing these tasks. Thus, many of the steps in this flowchart may take place simultaneously and/or in different order than as shown. Communication system 100 may also use methods with additional steps, fewer steps, and/or different steps, so long as the methods remain appropriate.

Method 300 begins at step 302 where communication node 108 receives a request from device 102 for foreign services. If communication node 108 is not locally storing the authentication information for accessing the foreign services at decisional step 203, then, at step 306, communication code 108 transmits a request to a native device 102 for the authentication information. Communication node 108 identifies the authentication node at step 308 either in local memory or in a response from the native device 102. At step 312, communication node 108 transmits the authentication information to core network 104 to access the foreign services. In response to at least the authentication information, communication node 108 receives the foreign services at step 314 and converts them to a form compatible with the requesting device 102 at step 316.

Figure 4A:
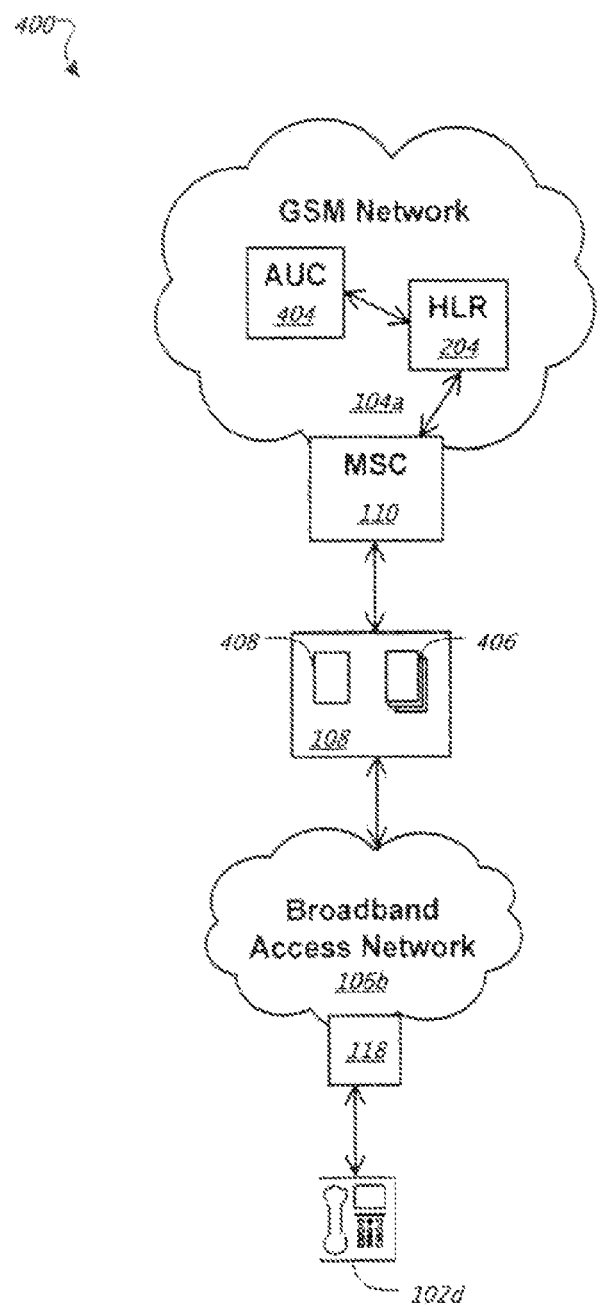
FIGS. 4A and 4B are block diagrams of communication system of FIG. 1 for authenticating foreign devices independent of a master device.
Figure 4B:
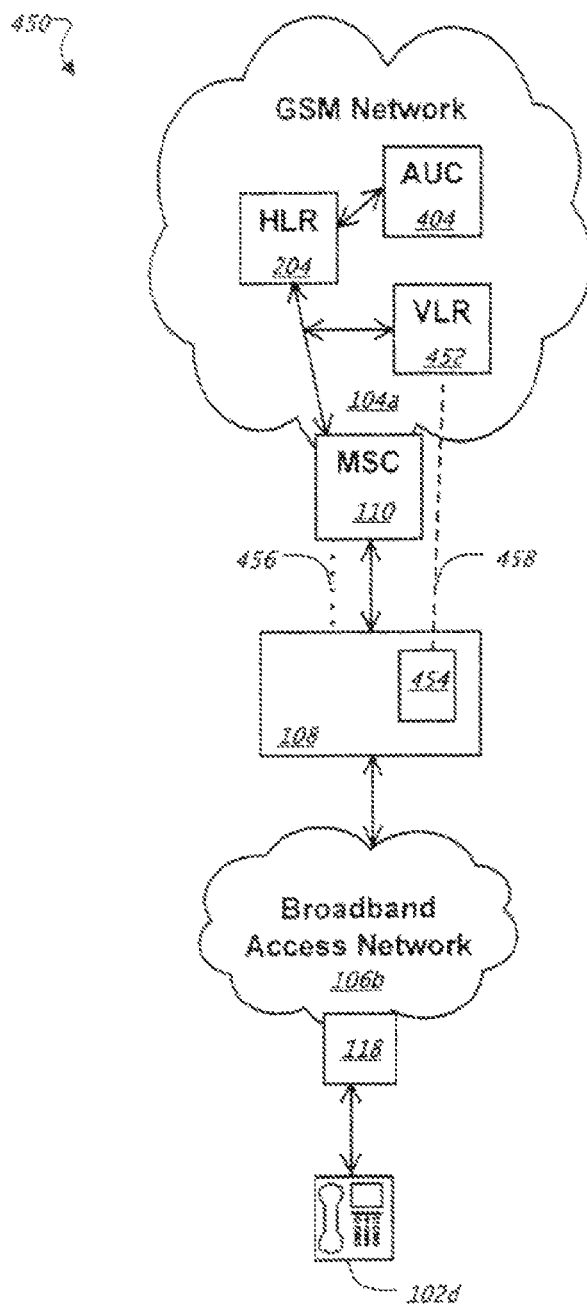

FIGS. 4A and 4B are block diagrams of communication system 100 for authenticating foreign devices 102 independent of a master device 102. For ease of reference, only some of the elements of communication system 100 of FIG. 1 are shown. As discussed above, system 100 may use authentication information associated with a device 102, i.e., a master device 102, for providing foreign services to a different device 102. For example, system 100 may use information and functionality provided in a SIM card of a GSM device 102 to provide GSM services to a SIP phone 102d. However, system 100 may, alternatively or in combination, authenticate foreign devices 102 independent of a master device 102. In other words, system 100 may authenticate SIP phone 102d with GSM network 104a independent of a SIM card or other user-controlled device containing authentication information. While the following description is in terms of mobile core network 104 being a GSM network 104a and device 102 being a SIP phone 102d, the scope of this disclosure contemplates that mobile core network 104 may be any other suitable mobile technology and/or device 102 may be another communication technology foreign to the mobile technology. Such implementations may use the same, none, or all of the features and functions described with respect to GSM technology and/or SIP technology.

Referring to FIG. 4A, system 100 authenticates SIP phone 102d with GSM network 104a using authentication information independent of a SIM card. As discussed above, SIP phone 102d may be foreign with GSM network 104a, and, as a result, SIP phone 102d may not be able to directly access and/or receive services from GSM network 104a. To overcome this obstruction, system 100 may associate authentication information with SIP phone 102d independent of a master device 102 and use the associated authentication information to provide GSM services to SIP phone 102d. For example, system 100 may associate an International Mobile Subscriber Identity (IMSI) and a Subscriber Authentication Key (Ki) with SIP phone 102d independent of a SIM card. In doing so, system 100 may perform authentication of SIP phone 102d with GSM network 104a using standard GSM authentication procedures, for example by using the A3, A5, or A8 encryption algorithm or a combination of these.

At a high level, GSM network 104a includes Home Location Register (HLR) 204 and Authentication Center (AUC) 404. The HLR 204 contains a database of GSM subscriber data. The HLR 204 may also contain information regarding which services each user has subscribed to. In addition, the HLR 204 may be used to track the billing of each user within the GSM core network 104a. The HLR 204 references the AUC 404 by the subscriber's IMSI, which acts as a subscriber record identification number, to retrieve authentication data when a user is attempting connection to the GSM network 104a. The AUC 404 generates authentication data based on a stored Ki which is held both by the GSM device, typically within its SIM card, and the AUC 404. This authentication data is used by the MSC 110 to authenticate users. Once a user has been authenticated, the AUC 404 stores the active subscriber's authentication key.

Network node 108 includes authentication information 406 and a SIM engine 408. The SIM engine 408 uses authentication information 406 to mimic the authentication procedure performed within a SIM card to authenticate a GSM device 102 within the GSM core network 104a. In some embodiments, SIM engine 408 comprises software operable to perform the authentication process performed by a SIM card. In other words, SIM engine 408 may comprise a soft-SIM. Authentication information 406 may be in any format and include any information required for authenticating a device with GSM core network 104a. In one embodiment, authentication information 406 is provided by the operator of GSM core network 104a to replicate information stored with HLR 402 and AUC 404. In one embodiment, the authentication information 406 includes a copy of the Ki which is also present within the AUC 404. Additionally, the authentication information 406 may include the subscriber's IMSI. In some embodiments, the authentication information includes an authentication vector with a random number (RAND) and Signature Response (SRES). HLR 402 may compare the SRES generated by AUC 404 with the SRES generated by SIM engine 408 in authenticating foreign device 102.

The SIM engine 408, though not necessarily equivalent to a SIM card, performs the tasks for completing the authentication cycle with the GSM core network 104a. When a foreign device 102 wishes to access GSM core network 104a, SIM engine 408 locates and/or generates authentication information to enable the authorization transaction with GSM core network 104a. The SIM engine 408 sends an authentication request to the MSC 110 on behalf of the foreign device 102. This allows foreign device 102 to appear to GSM core network 104a as a native device 102 associated with the authentication information 406.

During the authentication transaction process, SIM engine 408 may perform encryption algorithms for sharing authentication information with MSC 110. In the example of the A3 algorithm method of encryption, the GSM core network 104a may provide the network node 108 with a random number (RAND) to be used to generate a signature response (SRES). The A3 algorithm uses the RAND and the Ki to generate the SRES. On the side of the GSM core network 104a, the AUC 404 may also calculate the SRES for comparing with the SRES generated by SIM engine 408, and the HLR 402 holds this value for comparison to the SRES calculated by SIM engine 408.

In one aspect of operation, SIP phone 102d connects to broadband network 106d via the network access point 118, for example a local internet service provider network. As a foreign device, the SIP phone 102d requests access to GSM core network 104a. First, SIP phone 102d must be authenticated within its home network, i.e. IMS network 104c (see FIG. 1). The IMS network 104c transmits an authentication request to the SIP phone 102d. SIP phone 102d responds with authentication information and achieves authorization within the IMS network 104c.

Next, network node 108 intercepts a request from SIP phone 102d for access to GSM core network 104a. Network node 108 acts on behalf of SIP phone 102d to obtain authentication from GSM core network 104a. Previously stored authentication information 406 is used by SIM engine 408 to emulate the authentication activities of the SIM card attached to a GSM device 102. A mirror copy of this authentication information resides within AUC 404 in GSM core network 104a. HLR 402 share the authentication information with MSC 110 which negotiates with the SIM engine 408 within network node 108 for authentication of SIP phone 102d. Once acknowledgement of authentication is obtained from MSC 110, network node 108 is capable of channeling GSM services to the SIP phone 102d. For example, network node 108 may relay communications between SIP phone 102d and GSM core network 104a. In addition, network node 108 may provide communication translation between the networking communication protocols communicated by GSM core network 104a and the networking communication protocols native to SIP phone 102d.

Referring to FIG. 4B, system 100 authenticates SIP phone 102d with GSM core network 104a by presenting network node 108 as a base station controller (BSC) and as a mobile switching center (MSC). For example, system 100 may present network node 108 as a BSC to GSM core network 104a to perform authentication steps for SIP phone 102d, while it also presents network node 108 as an MSC to GSM network 104a to provide authentication information for the authentication process. In short, network node 108 may communicate with GSM network 104a over an A-interface 456 as well as a Map-G interface 458 to provide GSM services to SIP phone 102d. In this case, network node 108 may provide authentication information to Visitor Location Register (VLR) 452 over the Map-G interface 458. As discussed above, SIP phone 102d may be foreign with GSM network 104a, and, as a result, network node 108 may represent SIP phone 102d as a GSM device. In doing so, GSM network 104a, in the event that the represented GSM device cannot be identified through locally stored subscriber databases within the HLR 204 and VLR 452, may request information to authenticate this device from a different mobile core network. In this case, GSM network 104a may use the Location Area ID (LAI) to request authentication information associated with SIP phone 102d. In the event that the LAI identifies network node 108, GSM network 104a may request authentication information over the Map-G interface 458. In short, network node 108 may provide authentication information not employed in a mobile core network to authenticate SIP phone 102d with GSM core network 104a.

At a high level, GSM core network 104a includes HLR 204, VLR 452, and AUC 404. The AUC 404 contains authentication data keys (Ki) associated with each International Mobile Subscriber Identity (IMSI). The HLR 204 may access this authentication information for validating subscribers with GSM core network 104a. The HLR 204 contains "permanent" database of GSM subscriber data, while the VLR 452 (and/or an SGSN) "temporarily" maintains subscriber data retrieved from the HLR along with up-to-date information on the location of communications devices 102, stored within a Location Area ID (LAI). The VLR 452 also correlates each IMSI record with a Temporary Mobile Subscriber Identity (TMSI) for identification of subscribers associated with a particular Location Area (LA). Thus, a subscriber becomes uniquely identified via the combination of TMSI and LAI. Whenever a subscriber switches into a new LA, the LAI and TMSI must be updated accordingly within the VLR 452. The LAI and TMSI may be broadcast across system 100, preferably in an encrypted format, while the IMSI remains hidden to ensure it security.

Network node 108 includes a VLR 454 as well. In one embodiment, no corresponding permanent records reside within network node 108. Rather, subscriber records are generated and authenticated to provide foreign devices 102 with a means of connecting to the GSM core network 104a. In another embodiment, a collection of IMSI identifiers not assigned to any pre-existing mobile devices 102 may be reserved for use by network node 108 to authenticate foreign devices 102.

Network node 108 is capable of interfacing with GSM code network 104a as both a BSC and an MSC, mimicking both the authentication request and approval of a foreign device 102. Network node 108 represents itself as a BSC to MSC 100 by initiating a Location Area (LA) hand-off between GSM core network 104a and a nonexistent core network, meaning that the subscriber associated with the hand-off had been previously communicating within GSM core network 104a and may now switch to the phantom core network. This phantom core network is addressed with a Location Area ID (LAI) corresponding to the address of the network node 108. Network node 108 communicates a generated TMSI along with its own LAI to MSC 110 over A-interface 456.

MSC 110 provides VLR 452 with the identifier pair, which VLR 452 may fail to locate amongst its records. According to GSM standard, if VLR 452 suffers a database failure in which an IMSI entry appears to be missing, the MSC 110 may request acknowledgement of the subscriber's identity from the LA associated with the LAI provided by the subscriber device 102. In this way, when MSC 110 attempts to obtain authentication information from the provided LA, it is once again communicating with network node 108. However, this time the network node 108 is representing itself as an MSC within a separate mobile core network 104 from GSM network 104a to communicate its subscriber information, stored within VLR 454, to VLR 452 of the GSM core network 104a. VLR 454 communicates with VLR 452 over the Map-G interface 458.

Network node 108 receives the request over the Map-G interface 458. Network node 108 associates an unused IMSI with foreign device 102 and sends the IMSI to MSC 110 in clear text. VLR 452 assigns a new TMSI and re-starts the encryption sequence. This entails corresponding with network node 108 along the A-interface 456, with network node 108 once again taking on the role of BSC to complete network hand-off for the foreign device 102. During this exchange, network node 108 receives a TMSI and LAI pair which it associates with the recently assigned IMSI and stores within VLR 454.

Now that both VLR 452 and 454 contain matching IMSI, TMSI, and LAI information, network node 108 is capable of requesting services from GSM network 104a by transmitting an authentication request to MSC 110 as any standard network element forwarding communications along the path between a communications device 102 and a core network 104. Once authentication of the known record is successful, network node 108 may further provide translation services and communications routing for foreign device 102 to communicate via GSM core network 104a.

In one aspect of operation, SIP phone 102d connects to broadband network 106d via the network access point 118, for example a local internet service provider network. As a foreign device, the SIP phone 102d requests access to GSM core network 104a. First, SIP phone 102d must authenticate itself within its home network, i.e. IMS core network 104c. The IMS core network 104c transmits an authentication request to the SIP phone 102d. SIP phone 102d responds with authentication information and achieves authorization within the IMS core network 104c.

Next, network node 108 intercepts a request from SIP phone 102d for access to foreign core network 104d. Network node 108 acts on behalf of SIP phone 102d to obtain authentication from GSM core network 104a. Behaving as a BSC, network node 108 initiates a location area hand-off between GSM core network 104a and a core network represented by network node 108 itself. VLR 452 fails to locate subscriber information relating to SIP phone 102d, so it communicates with network node 108 along the Map-G interface 458 to request subscriber verification from the subscriber's previous network location (i.e. network node 108). Network node 108 generates and provides subscriber information from VLR 454 which allows VLR 452 to create a subscriber entry for SIP phone 102d.

Once VLR 452 contains a subscriber entry for SIP phone 102d, MSC 110 completes the location area hand-off with SIP phone 102d by providing updated temporary subscriber information from VLR 452 to SIP phone 102d along the A-interface 456. Acting as a BSC, network node 108 receives this subscriber information and completes the entry in VLR 454 associated with SIP phone 102d. Using the temporary subscriber information provided by core GSM network 104a, and acting as any standard network element forwarding information along the path from a communication device 102 and the GSM core network 104a, network node 108 submits an authentication request for SIP phone 102d to obtain services from GSM core network 104a.

Figure 5:
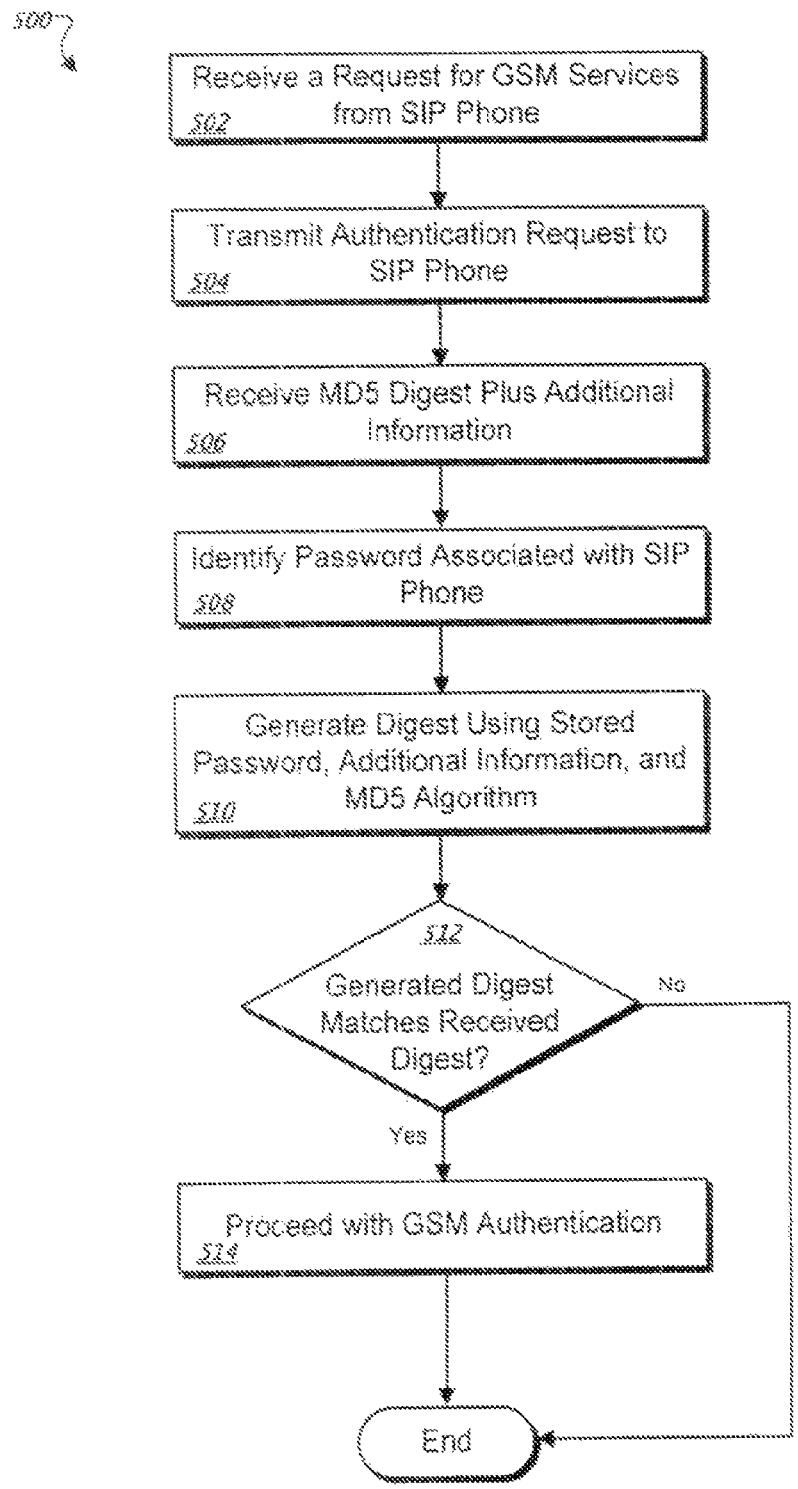
FIG. 5 is a flow chart illustrating an example method for authenticating a Session Initiation Protocol device in communication system of FIG. 1.

FIG. 5 is a flow diagram illustrating an example method 500 for authenticating a foreign device with its local core network service in a communication system. The illustrated method is described with respect to communication system 100 of FIG. 1, but these methods could be used by any other suitable system. Moreover, communication system 100 may use any other suitable techniques for performing these tasks. Thus, many of the steps in this flowchart may take place simultaneously and/or in different order than as shown. Communication system 100 may also use methods with additional steps, fewer steps, and/or different steps, so long as the methods remain appropriate.

Method 500 begins at step 502 where network node 108 receives a request for foreign network services from a foreign 102. For example, SIP phone 102d may be a foreign device to GSM core network 104a. In this case, SIP phone 102d first requires authentication from its home network. At step 502, network node 108 identifies the originating communication technology. In the example, network node 108 identifies that SIP phone 102d is a SIP device requesting services through broadband access network 106b. If network node 108 determines that the originating and terminating communication technologies are different, authentication with the home network, in this example IMS core network 104c, may be required before authentication with the foreign core network 104, in this example GSM core network 104a, may proceed.

Network node 108 transmits an authentication request to the foreign device 102 from the home network in step 504. For example, completing the authentication request transaction may grant SIP phone 102d access to its home network, IMS core network 104c. In response, in step 506, foreign device 102 provides authentication information for its home network, for example the IMS core network 104c. In one embodiment, SIP phone 102d transmits authentication information in the form of a Message-Digest algorithm 5 (MD5) encrypted digest plus additional authentication information.

In step 506, network node 108 receives the authentication information from the foreign device 102, i.e. an MD5 digest plus additional information, and forwards this communication to the home network, i.e. IMS core network 104c. The home network locates a stored password associated with foreign device 102 at step 508, for example within the subscriber database of IMS core network 104c. At step 510, the home network generates an encrypted authentication message using the same password and technique as used by the foreign device 102. For example, the IMS core network 104c may generate an MD5 digest using the stored password, additional information, and the MD5 encryption algorithm.

At decisional step 512, the home network determines whether the encrypted authentication message generated by the foreign device 102 matches the locally generated authentication method. In one embodiment, IMS core network 104c compares a locally generated MD5 digest to the MD5 digest created by SIP phone 102d. If the two authentication messages match, the authentication process has succeeded. Network node 108 may now, at step 514, proceed with the foreign network 104 authentication process which had been requested at step 502. For example, network node 108 may now proceed with the authentication process to connect SIP phone 102d with the GSM core network 104a. Otherwise, if authentication has failed, the foreign device 102 is denied further access to any core network services.

Figure 6A:
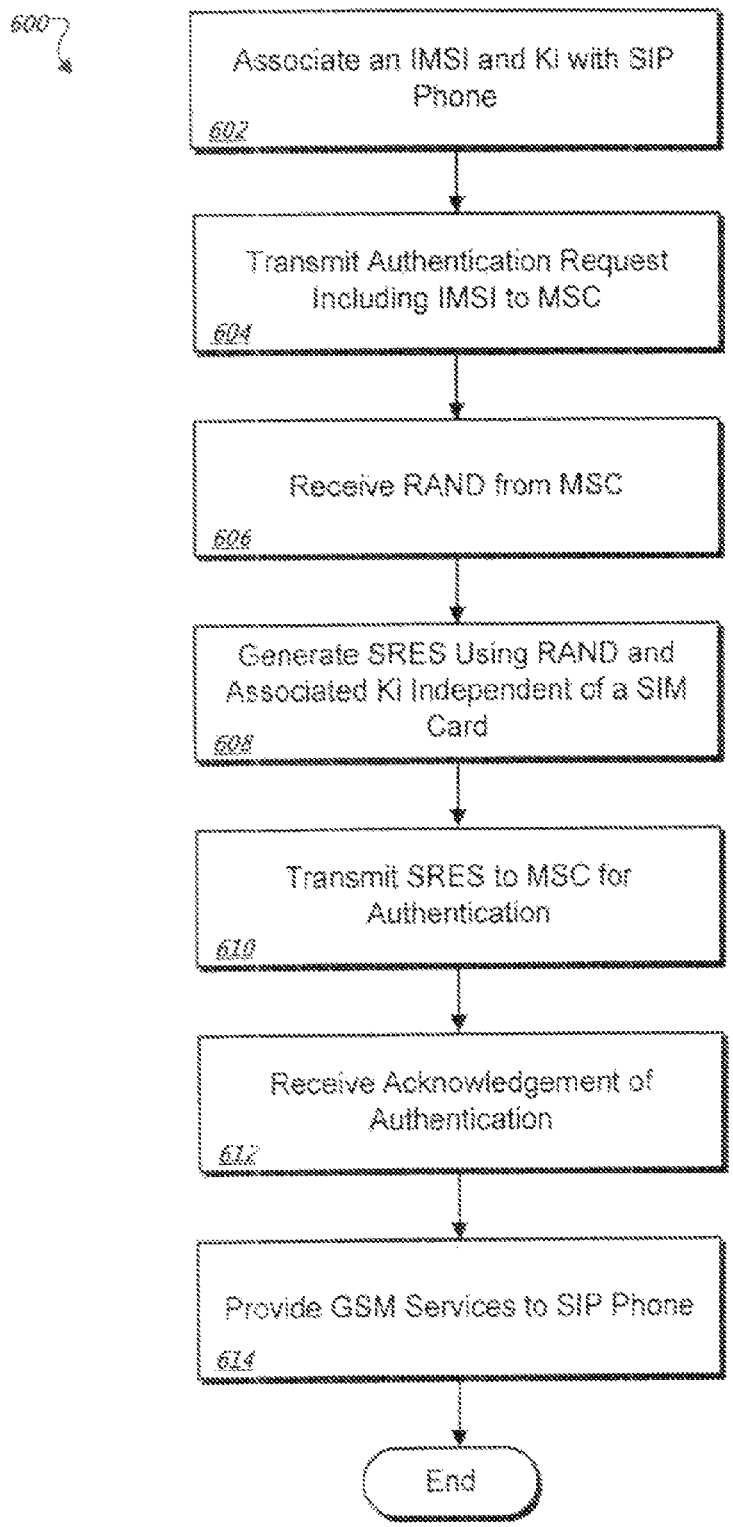
FIGS. 6A and 6B are flow charts illustrating example methods for authenticating foreign devices in communication system of FIG. 1 independent of a master device.
Figure 6B:
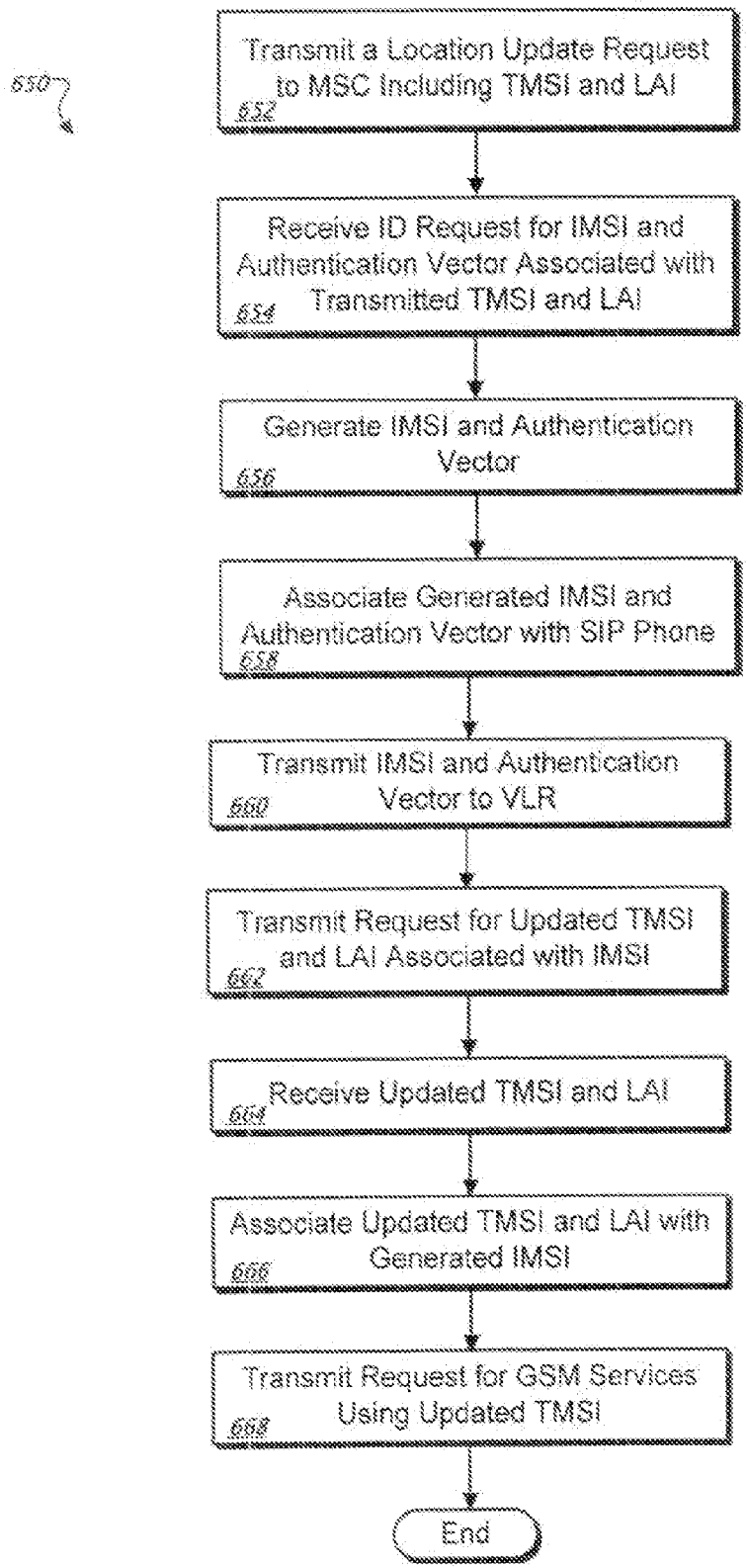

FIGS. 6A and 6B are flow charts illustrating two methods 600 and 650 for authenticating GSM services with a foreign device 102. Methods 600 and 650 describe in detail two separate processes which may be used for fulfilling step 514 of the method 500 described within FIG. 5. The illustrated methods are described with respect to communication system 100 of FIG. 1, but these methods could be used by any other suitable system. Moreover, communication system 100 may use any other suitable techniques for performing these tasks. Thus, many of the steps in this flowchart may take place simultaneously and/or in different orders as shown. Communication system 100 may also use methods with additional steps, fewer steps, and/or different steps, so long as the methods remain appropriate.

Referring to FIG. 6A, method 600 describes a process for authenticating foreign devices with respect to block diagram 400 of FIG. 4A. In this circumstance, a foreign device 102 has already been authenticated within its home network 104 and has requested authentication with a foreign core network 104. Method 600 begins at step 602 where network node 108 associates identifying and/or authenticating information for foreign core network 104 with the foreign device 102. In one example, an IMSI and Ki, stored within a record of authentication information 406, are associated with SIP phone 102d.

At step 604, network node 108 transmits an authentication request, including the authentication information derived within step 602, to the foreign core network 104. In one embodiment, the SIM engine 408 within network node 108 encrypts the IMSI and Ki associated with SIP phone 102d within an encryption key Ke, and network node 108 transmits this information to MSC 110 of GSM core network 104a. In response, in step 604, the foreign core network 104 transmits an encryption seed to network node 108 to be used to generate further authentication data. For example, the MSC 110 may provide network node 108 with a random number (RAND).

Using the encryption seed provided by the foreign network 104, both the network node 108 and the foreign network 104 generate an encrypted authentication key at step 608. In one embodiment, SIM engine 408 within network node 108 and the AUC 404 within GSM core network 104d both encrypt the stored Ki associated with SIP phone 104d using the A3 encryption algorithm and the RAND to generate a signature response (SRES). Once the encrypted authentication key has been generated by the network node 108, it is transmitted to foreign network 104 at step 610 for authentication purposes. For example, the SRES generated by SIM engine 408 is transmitted by network node 108 to the MSC 110.

The foreign network 104 compares the transmitted encrypted authentication key to the locally generated encrypted authentication key, and responds to network node 108 with an acknowledgement of authentication. For example, the MSC 110 determines whether or not the SRES generated by SIM engine 408 matches the SRES generated by AUC 404. At step 612, network node 108 receives acknowledgement of authentication from foreign network 104. In one embodiment, MSC 110 transmits acknowledgement of authentication to network node 108 on behalf of GSM core network 104a. Network node 108 may then begin to provide the services of foreign network 104 to foreign device 102. For example, network node 108 may enable SIP phone 102d to use GSM services offered by GSM core network 104a.

Referring to FIG. 6B, method 650 describes a process for authenticating foreign devices with respect to block diagram 450 of FIG. 4B. In this circumstance, a foreign device 102 has already been authenticated within its home network 104 and has requested authentication with a foreign core network 104. Method 650 begins at step 652 where network node 108 transmits a location update request for foreign network 104 on behalf of foreign device 102. A location update request involves the transfer of a device 102 from one location area (LA) to another. In one example, the location update request includes a TMSI generated by network node 108 on behalf of SIP phones 102d plus an LAI addressing the network node 108 as the location that SIP phone 102 is being transferred from. In this case, the location update request is transmitted to MSC 110 of GSM core network 104a over the A-interface 456, because the network node 108 is behaving as a BSC.

Foreign network 104 may not be capable of locating a known device 102 within its subscriber database matching the information provided by network node 108. Thus, at step 654, foreign network 104 transmits an identification request for device 102 to the address contained within the location update request. This address correlates to network node 108, which receives the identification request. In one example, network node 108 receives a request over Map-G interface 458 from VLR 452 of GSM core network 104a for an IMSI and authentication vector associated with the TMSI which GSM core network 104a received within the location update request. In this circumstance, network node 108 is acting as the MSC of another mobile core network 104.

In step 656, network node 108 generates identification information regarding foreign device 102 to send to foreign network 104. For example, an IMSI and authentication vector may be created to supply to GSM core network 104a to authenticate SIP phone 102d. In one embodiment, the IMSI is allocated from a supply of IMSI identifiers which are not presently in use within a mobile core network 104. The network node 108 may additionally store the IMSI associated with SIP phone 102d in a new database record within VLR 454.

Network node 108 transmits the identification information generated in step 656 for foreign core network 104 at step 660. In one example, the IMSI and authentication vector are sent from network node 108 to VLR 452 of GSM core network 104a over the Map-G interface 458, with network node 108 behaving as the MSC attached to a separate mobile core network 104.

Foreign core network 104 generates a new set of temporary subscriber identification information for the foreign device 102 identified within the message transmitted by network node 108 in step 656. In step 662, network node 108 transmits a request for this new set of temporary subscriber information to update its records. In one example, network node 108, acting as an MSC, transmits a request along the Map-G interface 458 to VLR 452 for the updated TMSI and LAI associated with SIP phone 102d.

In step 664, network node 108, on behalf of foreign device 102, receives updated temporary subscriber information from foreign network 104. In one example, the GSM core network 104a transmits the new TMSI and LAI to SIP phone 102d by way of A-interface 456. Network node 108, acting as a BSC, intercepts this message. In addition, network node 108 receives, in response to the request sent at step 662, updated temporary subscriber information from foreign network 104. In this circumstance, network node 108 is behaving as an MSC. VLR 452 of GSM core network 104a sends the new TMSI and LAI to network node 108 so that, as the MSC of another mobile core network, network node 108 may update its VLR 454 to match the record held by VLR 452.

Network node 108, at step 666, further associates this updated temporary subscriber information with the subscriber identification it generated during step 656. In the example of the SIP phone 102d accessing the GSM core network 104a, the TMSI and LAI generated by VLR 452 are stored within VLR 454 in a record indexed by the IMSI generated in step 656.

Now that the network node 108 has obtained subscriber identification and authentication information for foreign device 102 matching a record stored by the foreign network 104, network node 108 is capable of transmitting a request, on behalf of foreign device 102, for network services from foreign network 104 at step 668. In one embodiment, network node 108 may transmit a request for GSM services to GSM core network 104a via MSC 110 on behalf of SIP phone 104d. In this circumstance, network node 108 is behaving as any standard network element along the path from SIP phone 104d to GSM core network 104a, forwarding network communication. The authentication request in this example includes the TMSI and LAI obtained from VLR 452 during step 664.

FIGS. 7A and 7B illustrate a call flow in accordance with communication systems 450 of FIG. 4. In particular, flow 700 illustrates authenticating a SIP device 102d with mobile core network 104a independent of a SIM card. In the illustrated embodiment, communication node 108 performs the authentication process with mobile core network 104a transparent to SIP device 102d. In the illustrated embodiment, communication node 108 may present itself as either a BSC or MSC to authenticate SIP device 102d independent of a SIM card. In this case, communication node 108 may both provide authentication information to mobile core network 104a and verify SIP device 102d as a mobile device using the provided authentication information.

Although this disclosure has been described in terms of certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure.

What is claimed is:

1. A method, comprising:
   receiving by an IP network node, from an Internet Protocol (IP) device associated with a user, a request for services provided by a cellular core network including one of GSM and UMTS network, the IP device foreign to the cellular core network, and the IP network node including a direct interface to the cellular core network;
   transmitting, to a wireless mobile device by the IP network node, a request to generate authentication information using subscriber identification information stored at the wireless mobile device, the wireless mobile device native to the cellular core network, different from the IP device;
   receiving by the IP network node, from the wireless mobile device, the requested authentication information assigned to the wireless mobile device; and
   presenting by the IP network node, through the direct interface, the IP device foreign to the cellular core network as a mobile device native to the cellular core network using the authentication information received directly from the wireless mobile device, so that the IP device may access foreign services provided by the cellular core network.

2. The method of claim 1, the IP device comprising a Session Initiation Protocol (SIP) user device.

3. A method, comprising:
   receiving by an IP network node, from an IP device associated with a user, a request for services provided by a cellular core network including one of GSM and UMTS network, the IP device foreign to the cellular core network, and the IP network node including a direct interface to the cellular core network;
   identifying, by the IP network node, information for authenticating a first wireless mobile device also associated with the user with the cellular core network, the information received directly from the first wireless mobile device, the first wireless mobile device configured to access services provided by the cellular core network, and the first wireless mobile device native to the cellular core network and different from the IP device;
   representing by the IP network node, through the direct interface, the IP device as a second wireless mobile device to the cellular core network; and
   providing, via the IP network node, services from the cellular core network to the IP device represented as the second wireless mobile device using the authentication information received directly from the first wireless mobile device.

4. The method of claim 3, further comprising translating services to a form compatible with the IP device.

5. The method of claim 3, the IP device comprising a SIP user device.

6. An IP network node, comprising:
   a direct interface to a cellular core network including one of GSM and UMTS network;
   a receiver circuit configured to receive, from an IP device associated with a user, a request for foreign services provided by the cellular core network, the IP device being foreign to the cellular core network;

a transmitter circuit configured to transmit, to a wireless mobile device associated with the user, a request to generate authentication information using a subscriber identification module (SIM) residing in the wireless mobile device, the wireless mobile user device being native to the cellular core network, and different from the IP device; and an authentication element configured to present, through the direct interface to the cellular core network, the IP device foreign to the cellular core network as a device native to the cellular core network using the authentication information received directly from the wireless mobile device, so that the IP device may access foreign services provided by the cellular core network.

7. The system of claim 6, the IP device comprising a SIP user device.

8. A system, comprising:
a receiver circuit configured to receive, from an IP device associated with a user at an IP network node, a request for services from a cellular core network including one of GSM and UMTS network, the IP device foreign to the cellular core network, and the IP network node including a direct interface to the cellular core network; and an authentication element associated with the IP network node configured to:
identify information for authenticating a wireless mobile device also associated with the user with the cellular core network, the information received directly from the wireless mobile device, the wireless mobile device configured to access services from the cellular core network, the wireless mobile device native to the cellular core network and different from the IP device;

represent, through the direct interface, the IP device as the wireless mobile device to the cellular core network; and provide services from the cellular core network to the IP device using the authentication information received directly from the wireless mobile device.

9. The system of claim 8, further comprising a translator configured to translate services to a form compatible with the IP device.

10. The system of claim 8, the IP device comprising a SIP device.

* * * * *